(12) United States Patent
Nakamoto et al.

(10) Patent No.: US 7,446,813 B2
(45) Date of Patent: Nov. 4, 2008

(54) ACTIVE CAMERA APPARATUS AND ROBOT APPARATUS

(75) Inventors: Hideichi Nakamoto, Kanagawa-ken (JP); Junko Hirokawa, Tokyo (JP); Takashi Ichikawa, Saitama-ken (JP); Hideki Ito, Kanagawa-ken (JP); Hideki Ogawa, Kanagawa-ken (JP); Nobutaka Kikuiri, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 805 days.

(21) Appl. No.: 10/895,859

(22) Filed: Jul. 22, 2004

(65) Prior Publication Data
US 2005/0018074 A1 Jan. 27, 2005

(30) Foreign Application Priority Data
Jul. 25, 2003 (JP) ............................. 2003-201872

(51) Int. Cl.
*H04N 5/225* (2006.01)
*H04N 7/18* (2006.01)

(52) U.S. Cl. ................... 348/374; 348/373; 348/151
(58) Field of Classification Search .............. 348/218.1, 348/207.99
See application file for complete search history.

(56) References Cited

U.S. PATENT DOCUMENTS

| 4,713,976 | A | * | 12/1987 | Wilkes ........................ 476/21 |
| 4,901,146 | A | * | 2/1990 | Struhs et al. ................ 348/151 |
| 4,920,367 | A | * | 4/1990 | Pagano ....................... 396/427 |
| 5,900,923 | A | * | 5/1999 | Prendergast et al. ........ 351/221 |
| 6,057,880 | A | * | 5/2000 | Schnee ........................ 348/113 |
| 6,803,738 | B2 | * | 10/2004 | Erten .......................... 318/653 |
| 2003/0043279 | A1 | * | 3/2003 | Alardin ................... 348/211.3 |

FOREIGN PATENT DOCUMENTS

| JP | 02-042876 | 2/1990 |
| JP | 5-80883 | 2/1993 |
| JP | 6-29278 | 4/1994 |
| JP | 06-114167 | 4/1994 |

(Continued)

OTHER PUBLICATIONS

Yoshiyuki Miwa, et al. "Performance Robot Serving as Communication Media: Development of an "Eyeball Robot" Investigating Bodily Communication", The Int. J. of the Robotics Society of Japan, vol. 13, No. 3, pp. 279-281, 1999.

(Continued)

*Primary Examiner*—NgocYen T. Vu
*Assistant Examiner*—Temitope Adeyiga
(74) *Attorney, Agent, or Firm*—Oblon, Spivak, McClelland, Maier & Neustadt, P.C.

(57) ABSTRACT

An outer body of ball shell type has an opening. A camera is located in the outer body and receives an image from outside of the outer body through the opening. A camera support unit is located in the outer body and rotationally supports the camera along a first axis and a second axis mutually crossed at a center of the outer body. A first camera actuator is located in the outer body and rotationally actuates the camera around the first axis. A second camera actuator is located in the outer body and rotationally actuates the camera around the second axis.

5 Claims, 12 Drawing Sheets

FOREIGN PATENT DOCUMENTS

| | | |
|---|---|---|
| JP | 11-355622 | 12/1999 |
| JP | 2000-165738 | 6/2000 |
| JP | 2000-266985 | 9/2000 |
| JP | 2002-027309 | 1/2002 |
| JP | 2002-040548 | 2/2002 |

OTHER PUBLICATIONS

Cynthia Breazeal, et al. "How to Build Robots that Make Friends and Influence People", Proc. of the 1999 IEEE/RSJ Int. Conf. on Intelligent Robots and Systems, pp. 858-863, Oct. 17, 1999.

* cited by examiner

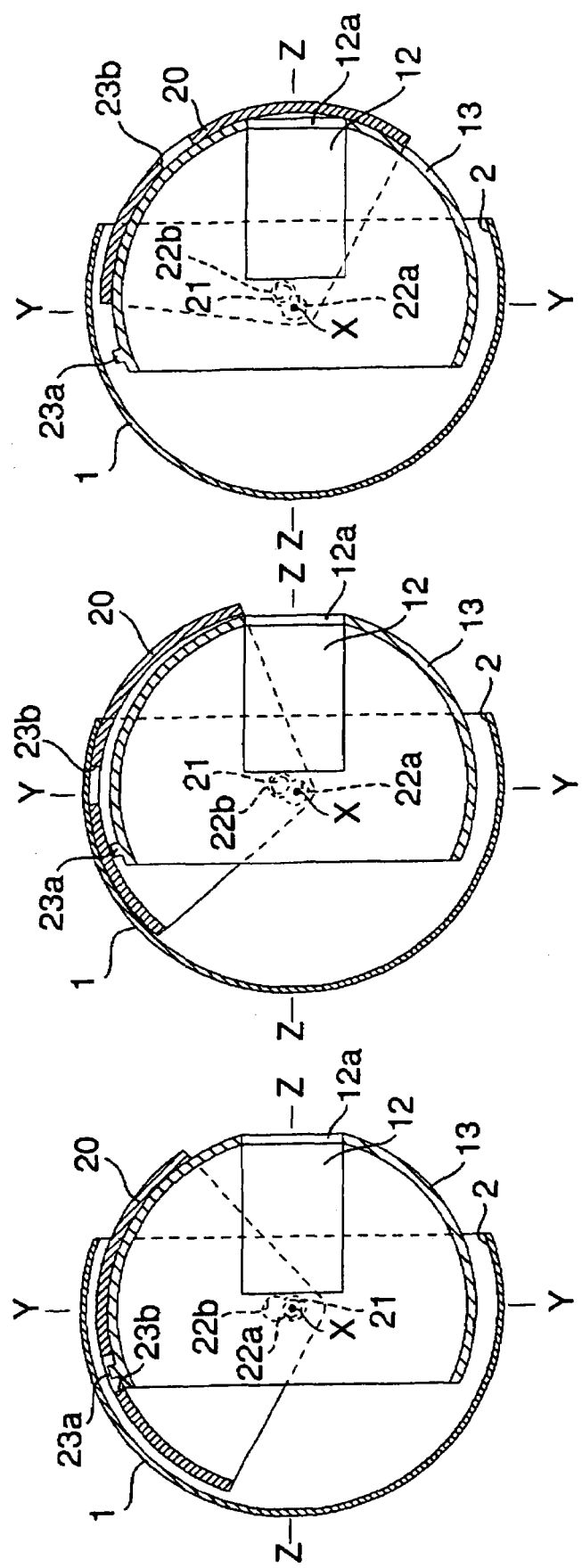

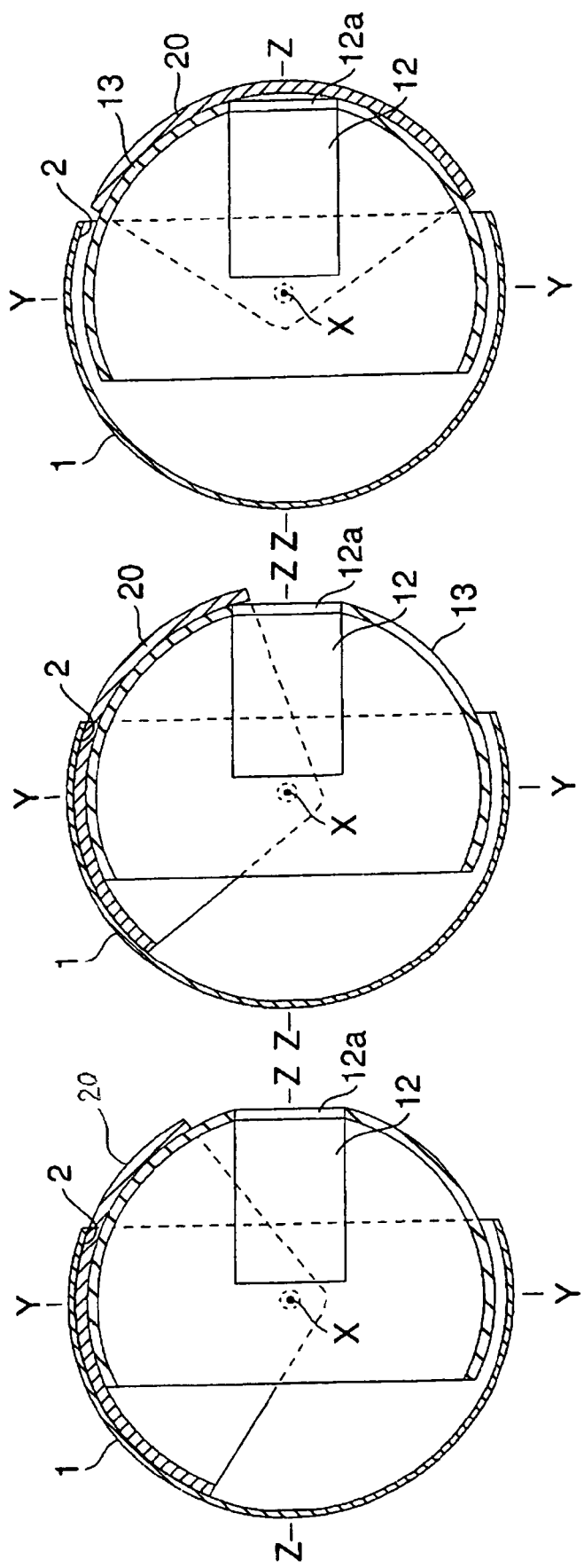

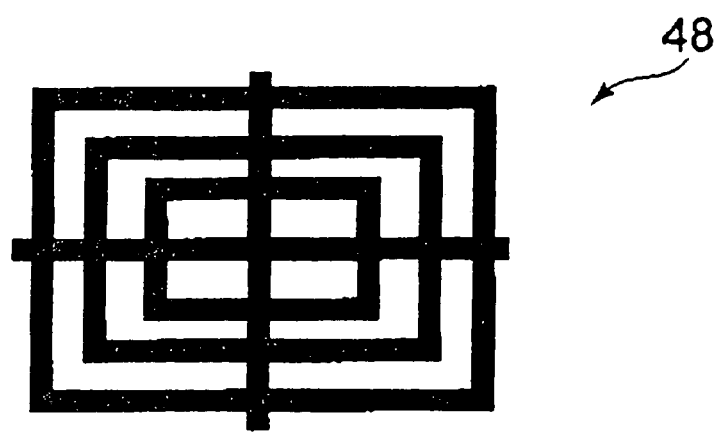
FIG. 1 1
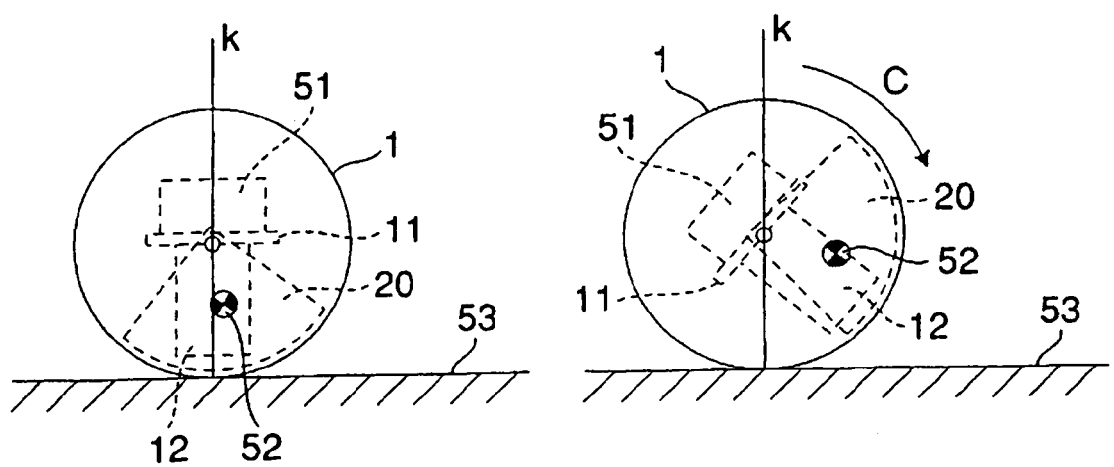
FIG. 1 2A   FIG. 1 2B

ACTIVE CAMERA APPARATUS AND ROBOT APPARATUS

CROSS-REFERENCE TO RELATED APPLICATIONS

This application is based upon and claims the benefit of priority from prior Japanese Patent Application P2003-201872, filed on Jul. 25, 2003; the entire contents of which are incorporated herein by reference.

FIELD OF THE INVENTION

The present invention relates to an active camera apparatus and a robot apparatus for positioning a viewpoint of an image sensor of a camera to a predetermined location.

BACKGROUND OF THE INVENTION

Some equipment utilized as an information processing apparatus or a robot apparatus includes a camera and executes a predetermined decision by monitoring an external environment or a movement of an imaging object through the camera. As one of such equipment, an active camera apparatus of which viewpoint changes by rotating the camera as a human's eye is known (For example, Japanese Patent Disclosure (Kokai) PH11-355622).

In this active camera apparatus, the camera is located in a body of a ball shell type. This camera is supported by a gimbal mechanism installed into the body, and rotated around two axes mutually crossed in the body. The gimbal mechanism is comprised of a pair of gimbals. One gimbal is located inside of the body, and the other gimbal is located outside of the body.

A camera actuator is located outside of the body. The camera actuator has a ring wire bound to the camera. By moving this wire along a predetermined direction, the camera in the body is actuated.

In such active camera apparatus, one gimbal is set in the body. Accordingly, the camera can be moved within a large actuation area. As a result, the camera can input an image from a wide field of view.

However, as mentioned-above, in the active camera apparatus of the prior art, the camera actuator is located outside of the body. Accordingly, the camera actuator is not protected from the external environment such as a dust, moisture, and a heat. Furthermore, the whole component of the active camera apparatus including the camera actuator becomes undesirably large.

SUMMARY OF THE INVENTION

The present invention is directing to an active camera apparatus and a robot apparatus in which the camera and the camera actuator can be protected from the external environment.

According to an aspect of the present invention, there is provided an active camera apparatus, comprising: an outer body of ball shell type having an opening; a camera in the outer body, the camera receiving an image from outside of the outer body through the opening; a camera support unit in the outer body, the camera support unit rotationally supporting the camera along a first axis and a second axis, the first axis and the second axis crossing at a center of the outer body; a first camera actuator in the outer body, the first camera actuator rotationally actuating the camera around the first axis; and a second camera actuator in the outer body, the second camera actuator rotationally actuating the camera around the second axis.

According to another aspect of the present invention, there is also provided a robot apparatus, comprising: an outer body of ball shell type having an opening; a camera as an eyeball in the outer body, the camera receiving an image from outside of the outer body through the opening; an open-close member as an eyelid rotationally located around a center of the outer body, the open-close member closing the opening by rotation; a camera support unit in the outer body, the camera support unit rotationally supporting the camera along a first axis and a second axis, the first axis and the second axis crossing at the center of the outer body; a first camera actuator in the outer body, the first camera actuator rotationally actuating the camera around the first axis; and a second camera actuator in the outer body, the second camera actuator rotationally actuating the camera around the second axis.

BRIEF DESCRIPTION OF THE DRAWINGS

FIGS. 5A, 5B, and 5C are schematic diagrams of a release situation of the linking mechanism between the camera support member and the open-close member according to the first embodiment of the present invention.

FIGS. 7A, 7B, and 7C are schematic diagrams of an open-close situation of an opening of an outer body according to the second embodiment of the present invention.

FIG. 11 is a schematic diagram of a target set on the inside of the open-close member according to the third embodiment of the present invention.

FIGS. 12A and 12B are schematic diagrams of a rolling situation of the active camera apparatus according to a fourth embodiment of the present invention.

DETAILED DESCRIPTION OF THE EMBODIMENTS

Figure 1:
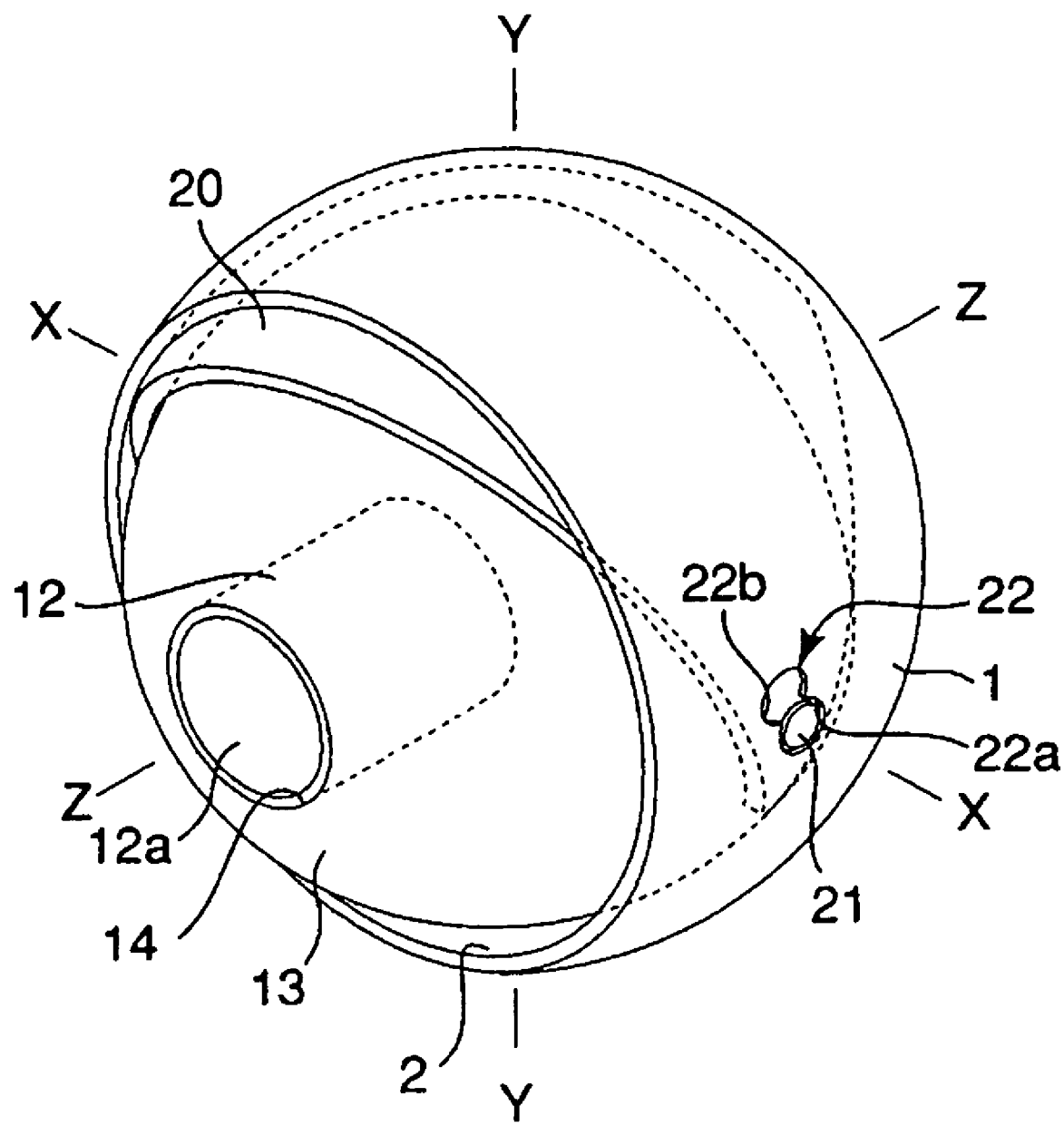
FIG. 1 is a schematic diagram of the outward appearance of an active camera apparatus according to a first embodiment of the present invention.

Hereinafter, various embodiments of the present invention will be explained by referring to the drawings.

Figure 2:
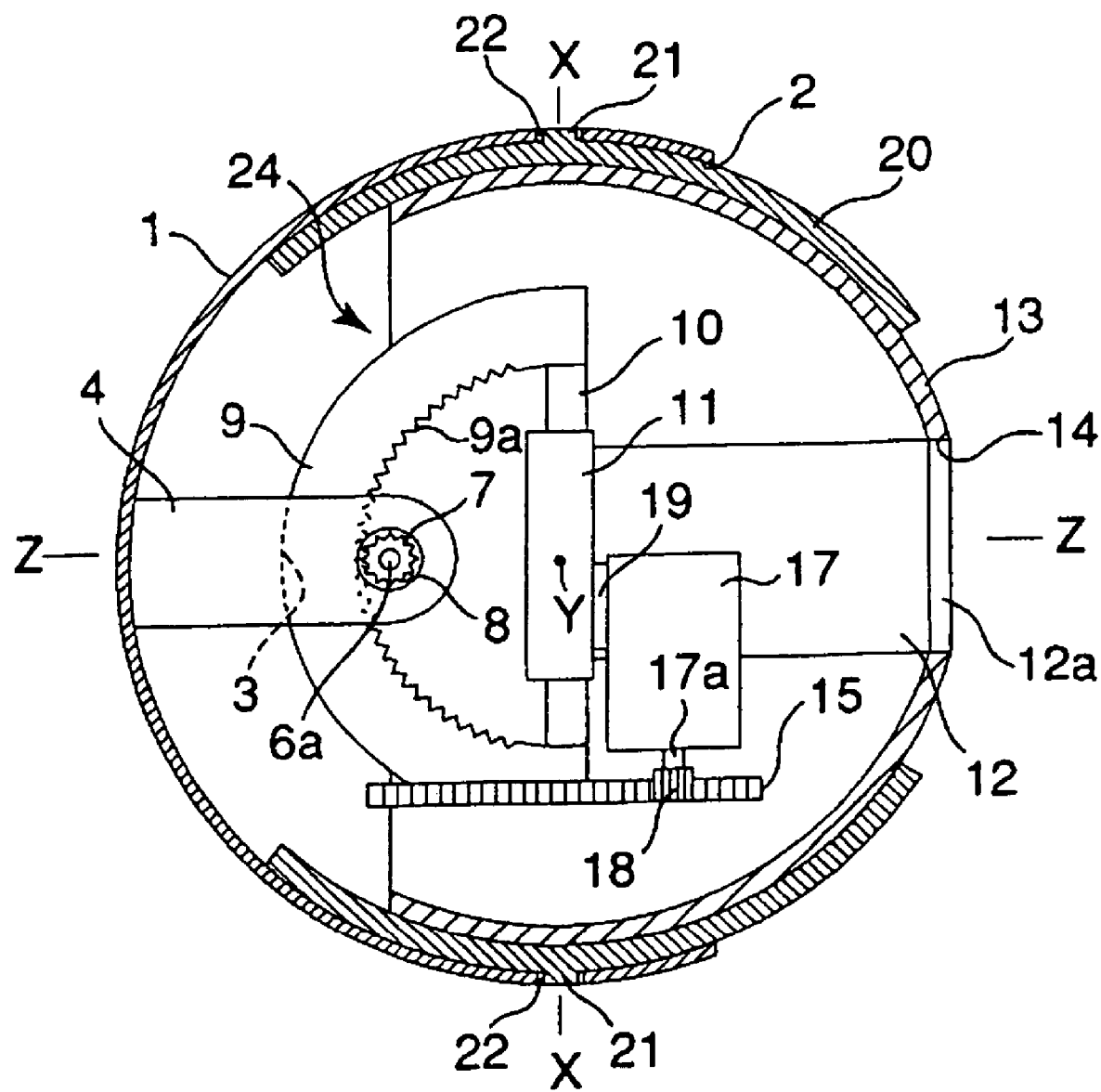
FIG. 2 is a sectional plan view of the active camera apparatus along the XZ plane according to the first embodiment of the present invention.
Figure 3:
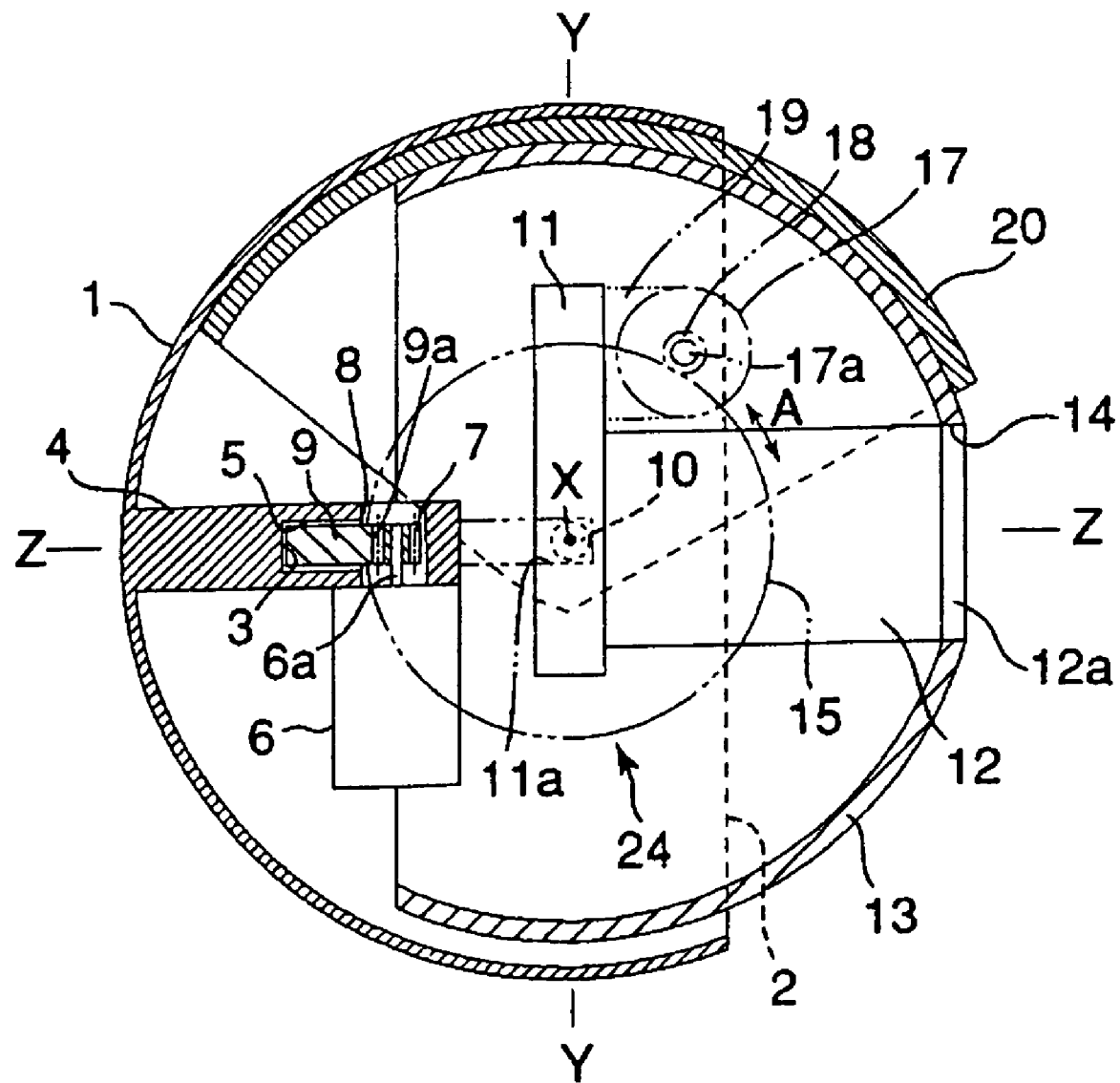
FIG. 3 is a sectional plan view of the active camera apparatus along the YZ plane according to the first embodiment of the present invention.

The first embodiment of the present invention is explained referring to FIGS. 1~5. FIG. 1 is a schematic diagram of the outward appearance of an active camera apparatus according to the first embodiment of the present invention. FIG. 2 is a sectional plan of a ball type camera unit by XZ plane according to the first embodiment of the present invention. FIG. 3 is a sectional plan of the ball type camera unit by YZ plane according to the first embodiment of the present invention.

As shown in FIGS. 1~3, the active camera apparatus of the present invention includes an outer body 1 of a ball shell type. An opening 2 is formed in the outer body 1. A transparent light member (not shown in the figures) formed by transparent material is put into the opening 2. The opening 2 is formed as a shape and a dimension not to obstruct a field of view of a camera 12.

A body fixed member 4 (support member) is fixed to the inside of the outer body 1. This body fixed member is comprised of a board member and projects toward a center of sphere of the outer body 1.

On a tip of the body fixed member 4, a first groove 5 is formed at a middle part along board thickness direction. The first groove 5 is formed along a longitudinal direction of the body fixed member 4. A base 3 of the first groove 5 is a circular surface of concentric with the center of sphere of the outer body 1.

Furthermore, on the tip of the body fixed member 4, a first motor 6 (a first camera actuator) is fixed. A first pinion gear 7 is joined with a rotation axis 6a of the first motor 6. The first pinion gear 7 is inserted into an insertion hole 8 set at the tip of the body fixed member 4, and an outer surface of the first pinion gear 7 faces one inside of the first groove 5.

An arcwise gimbal 9 (a half-toroidal member) has a low friction support in the inside of the first groove 5. The arcwise gimbal 9 is comprised of a half-toroidal board member and concentrically located as a center of sphere of the outer body 1. An outer surface of the arcwise gimbal 9 contacts the base 3 of the first groove 5. An inner surface of the arcwise gimbal 9 is located on the base side of the first groove 5 than the first pinion gear 7.

An inner gear 9a is formed on the inner surface of the arcwise gimbal 9. The inner gear 9a engages the first pinion gear 7. By actuating the first motor 6, the arcwise gimbal 9 is rotated around Y axis (a first axis) passing the center of sphere of the outer body 1.

A spur gear 15 is set to one edge of the arcwise gimbal 9. The spur gear 15 is perpendicularly fixed to the one edge of the arcwise gimbal 9 as shown in FIG. 2, and a rotation axis of the spur gear 15 coincides with X axis (a second axis).

Both edges of the arcwise gimbal 9 as a semicircle are connected by an axial member 10. The axial member 10 is a round stick having a approximately circular cross section. An axial center line of the axial member 10 approximately coincides with the X axis, perpendicularly crossing the Y axis at a center of the sphere of the outer body 1.

A mounting plate 11 (a mounting member) is set to the axial member 10. A support section 11a of ⊐ shape is formed on one face of the mounting plate 11. By engaging the support section 11a with the axial member 10, the mounting plate 11 rotates around the axial member 10.

A camera 12 is set to the other face of the mounting plate 11. The camera 12 includes an imaging device such as a CCD sensor or a CMOS sensor. An optical axis of the camera 12 coincides with the Z axis perpendicularly crossing the X axis and the Y axis. A front glass 12a is equipped on a front face of the camera 12.

Furthermore, a camera support member 13 of a ball shell type is fixed to the front side of the camera 12. The camera support member 13 is concentrically located in the sphere of the outer body 1. A mount opening 14 is formed on a part corresponding to the front face of the camera 12.

A second motor 17 (a second camera actuator) is fixed to a predetermined position of the mounting plate 11 through a bracket 19. A second pinion gear 18 is joined with a rotation axis 17a of the second motor 17. The second pinion gear 18 engages the spur gear 15. By actuating the second motor 17, the second motor 17 rotates around the spur gear 15 as shown by an arrow A of FIG. 3.

Briefly, the camera 12 and the second motor 17 are formed as one body through the mounting plate 11. Accordingly, by actuating the second motor 17, the camera 12 rotates around the axial member 10 (X axis).

When the second pinion gear 18 stops rotation by stopping actuation of the second motor 17, the camera 12 maintains a position dependent on the timing of stopping actuation.

As mentioned-above, by actuating the first motor 6, the arcwise gimbal 9 rotates around the Y axis by rotation of the first pinion gear 7. Accordingly, the camera 12 supported by the axial member 10 rotates around Y axis.

When the arcwise gimbal 9 stops rotation by stopping actuation of the first motor 6, the camera 12 maintains a position dependent on the timing of stopping actuation.

Briefly, the body fixed member 4, the arcwise gimbal 9, the axial member 10 and the mounting plate 11 comprise a camera support means 24 to rotationally support the camera 12 around X axis and Y axis.

An open-close member 20 is located in a space between the outer body 1 and the camera support member 13. The open-close member 20 is comprised of a part of a ball shell body. A support pin 21 is respectively projected on both edges of the outer surface of the open-close member 20. An axial center of the support pin 21 coincides with the X axis. The support pin 21 is rotationally supported by a support hole 22 set in the inside of the outer body 1.

Each support hole 22 is comprised of a first hole 22a and a second hole 22b as shown in FIG. 1. The first hole 22a and the second hole 22b are both round holes of the same diameter. The first hole 22a is formed at a position crossing the X axis on the outer body 1. The second hole 22b is formed at a position slightly eccentric from the first hole 22a on the outer body 1.

A connection part between the first hole 22a and the second hole 22b has a hole diameter shorter than each hole. The open-close member 20 can be slid along a contact direction between the camera support member 13 and the open-close member 20 by hand operation. Briefly, the support pin 21 can be slid between the first hole 22a and the second hole 22b.

Figures 4A, 4B, 4C:
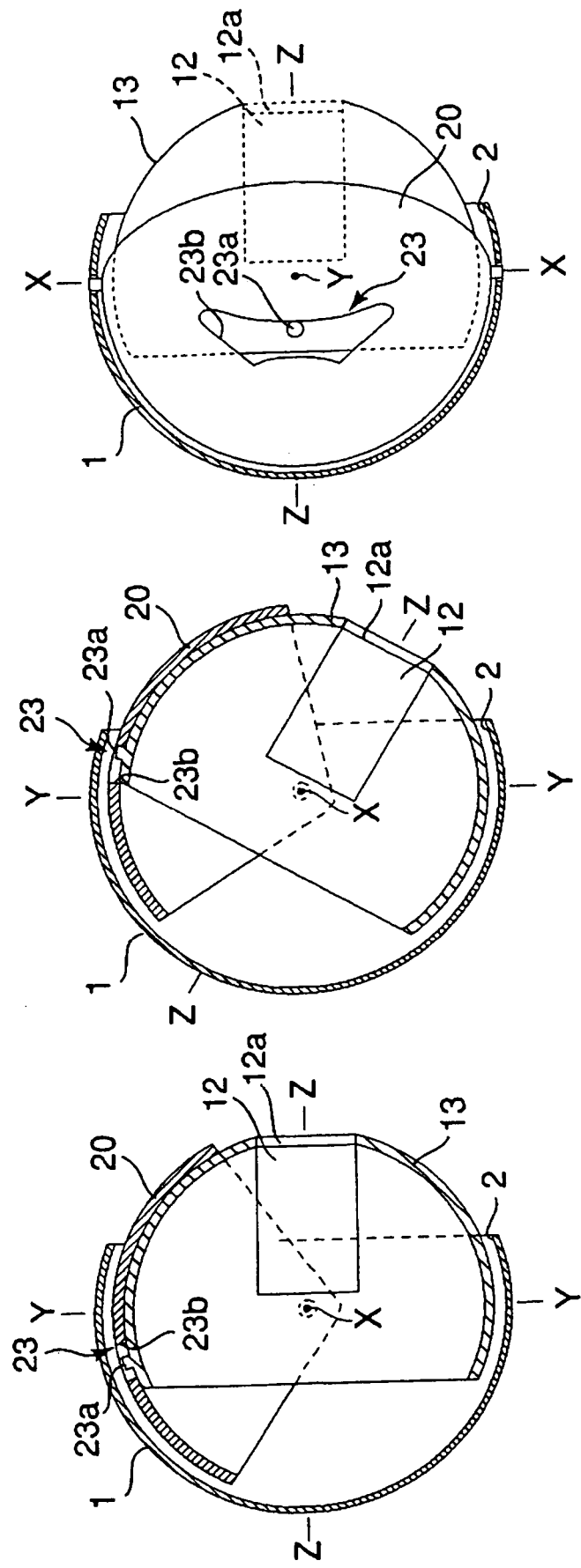
FIGS. 4A, 4B, and 4C are schematic diagrams of a linking mechanism between a camera support member and an open-close member according to the first embodiment of the present invention.

FIGS. 4A~4C are schematic diagrams of linking situation between the camera support member 13 and the open-close member 20 according to the first embodiment. FIG. 4A shows a situation before rotating the camera support member 13. FIG. 4B shows a situation of rotation of the camera support member 13. FIG. 4C shows another situation of rotation of the camera support member 13.

As shown in FIGS. 4A~4C, the open-close member 20 and the camera support member 13 are connected by a linking mechanism 23. The linking mechanism 23 is comprised of an engagement pin 23a set on an outer surface of the camera support member 13 and an engagement hole 23b set on the open-close member 20.

The engagement pin 23a is formed as a round section and located in a space between the camera support member 13 and the outer body 1. On the other hand, the engagement hole 23b is formed as a short length along a rotation direction around the X axis and a long length along a rotation direction around the Y axis (shown in FIG. 4C).

Accordingly, as shown in FIG. 4a, by inserting the engagement pin 23a into the engagement hole 23b, when the camera support member 13 rotates around the X axis, the engagement pin 23a is caught in an edge part of the engagement hole 23b as shown in FIG. 4C. As a result, the open-close member 20 and the camera support member 13 are moved with linking.

However, as mentioned-above, the engagement hole 23b is formed as a long length along a rotation direction around the Y axis. Accordingly, even if the camera support member 13 rotates around the Y axis, the engagement pin 23a is not caught in the edge part of the engagement hole 23b, and the open-close member 20 and the camera support member 13 are not moved with linking.

FIGS. 5A~5C are schematic diagrams of release situation of the linking mechanism between the camera support member 13 and the open-close member according to the first embodiment. FIG. 5A shows a non-release situation of the linking mechanism. FIG. 5B shows a release situation of the linking mechanism. FIG. 5C shows a situation that the opening of the outer body 1 is closed by the open-close member after releasing the linking mechanism.

As shown in FIGS. 5A~5C, this linking mechanism 23 can be released by hand operation. Concretely, in the situation that the linking mechanism 23 is not released as shown in FIG. 5A, by pulling up the open-close member 20 from the camera support member 13 along an alienation direction of X axis, a position of the support pin 21 is moved from the first hole 22a to the second hole 22b. In this case, as shown in FIG. 5B, the engagement pin 23a is picked out from the engagement hole 23b, and the linking between the open-close member 20 and the camera support member 13 is released. As a result, as shown in FIG. 5C, the open-close member 20 can freely move irrespective of the camera support member 13.

In the above explanation, the open-close member 20 can freely move when the support pin 21 fits into the second hole 22b. However, after the linking mechanism 23 is released, the open-close member 20 may move by fitting a position of the support pin 21 into the first hole 22a again.

In the above-mentioned active camera apparatus, the camera 12 is rotationally supported around the X axis and the Y axis mutually crossing at a center of sphere of the outer body 1. By actuating the first motor 6 and the second motor 17, a viewpoint (an optical axis) of the camera 12 can be rotated around a center of sphere of the outer body 1.

Furthermore, by adjusting actuation quantity of the first motor 6 and the second motor 17, a viewpoint of the camera 12 variously changes, and an imaging object can be taken from various angles.

In such active camera apparatus, in the first embodiment, the first motor 6 and the second motor 17 are accommodated in the outer body 1. Accordingly, the first motor 6 and the second motor 17 can be protected from the external environment conditions such as dust, moisture and heat, and the whole component of the apparatus can be miniaturized.

Furthermore, the open-close member 20 is rotationally located in the outer body 1 around X axis, and the opening 2 is opened and closed using the open-close member 20. Accordingly, by covering the front face of the camera 12 with the open-close member 20 during non-use time of the camera 12, the front glass 12a of the camera 12 can be protected. In addition to this, by setting a lens cleaner on the inside of the open-close member 20, a surface of the front glass 12a of the camera 12 can be cleaned using the open-close operation of the open-close member 20.

Figure 8:
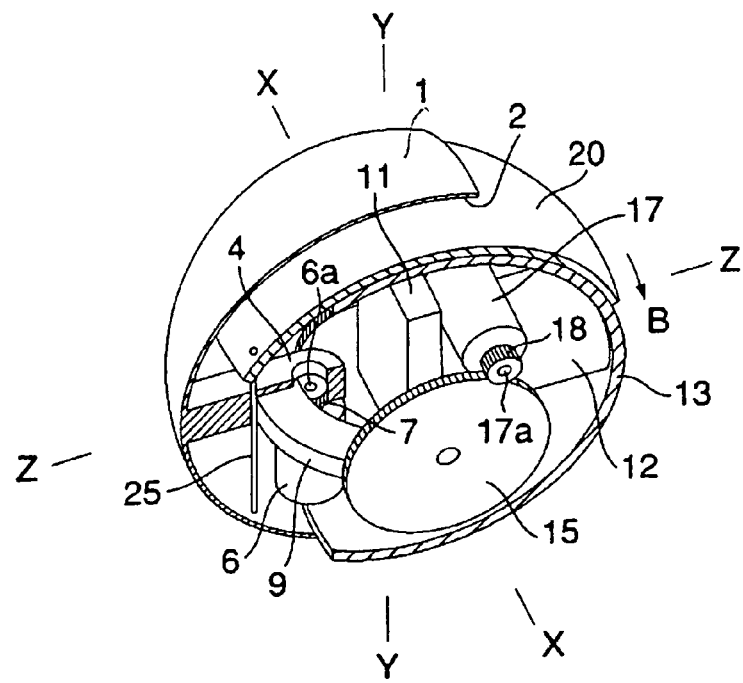
FIG. 8 is a schematic diagram of the outward appearance of the active camera apparatus as a sectional plane by YZ plane according to a modification of the second embodiment.

Next, the second embodiment of the present invention is explained referring to FIGS. 6~8. In this embodiment, as for components, activation, and operation the same as the first embodiment, its explanation is omitted.

Figure 6A:
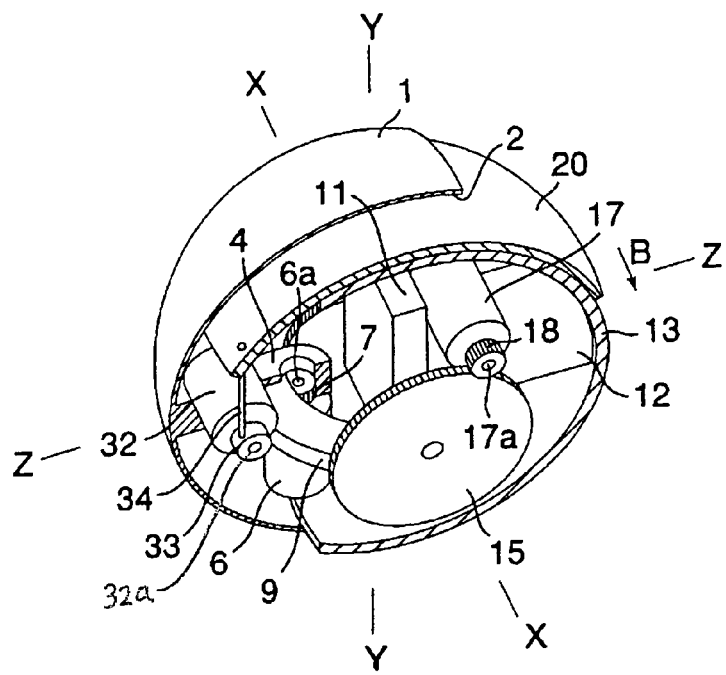
FIGS. 6A and 6B are schematic diagrams of components of the active camera apparatus according to a second embodiment of the present invention.
Figure 6B:
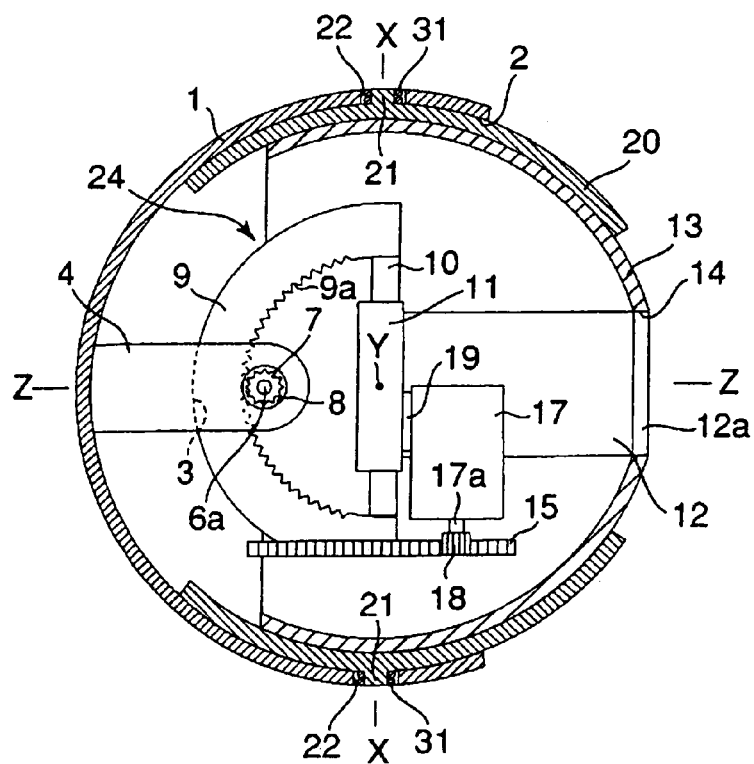

FIGS. 6A and 6B are schematic diagrams of components of the active camera apparatus according to the second embodiment of the present invention. FIG. 6A shows an outward appearance by cutting the active camera apparatus. FIG. 6B shows a section of the active camera apparatus.

FIGS. 7A~7C are schematic diagrams of closing situation of the opening 2 of the outer body 1 by the open-close member 20 according to the second embodiment. FIG. 7A shows a situation that the opening 2 of the outer body 1 is fully opened. FIG. 7B shows a situation that the opening 2 of the outer body 1 is slightly covered by the open-close member 20. FIG. 7C shows a situation that the opening 2 of the outer body 1 is fully closed by the open-close member 20.

In the second embodiment, as shown in FIGS. 6A and 6B, a torsion spring 31 is inter-carried between the support pin 21 and the support hole 22. The torsion spring 31 energizes the open-close member 20 along a closing direction of the opening 2 of the outer body 1, i.e., an arrow B direction as shown in FIG. 6A.

Furthermore, as shown in FIG. 6A, a third motor 32 (an open-close member actuator) is set in the outer body 1. A pulley 33 is joined with a rotation axis 32a of the third motor 33. A wire 34 is turned around the pulley 33. An edge part of the wire 34 is connected to the open-close member 20. By actuating the third motor 32, a length of the wire 34 pulled from the pulley 33 can be adjusted.

In such component, by actuating the third motor 32, the opening 2 of the outer body 1 can be easily opened and closed. Furthermore, by controlling actuation quantity of the third motor 32, an area of the opening 2 can be changed. Accordingly, a light quantity incident upon the camera 12 and a depth of field of the camera 12 can be easily adjusted based on imaging conditions.

For example, in order to sharply take a predetermined object in a field of view of the camera 12, as shown in FIG. 7A, the depth of field can be shortened by enlarging the opening 2 with the open-close member 20. In order to sharply take the whole image in the field of view of the camera 12, as shown in FIG. 7B, the depth of field can be lengthened by miniaturizing the opening 2 with the open-close member 20. Furthermore, at non-use time, as shown in FIG. 7C, the opening 2 of the outer body 1 is closed by the open-close member 20, and the open-close member 20 can function as a cover.

Furthermore, the optical quantity can be mechanically adjusted by the open-close member 20. Accordingly, in the case of utilizing a CCD sensor or a CMOS sensor as the imaging device of the camera 12, in comparison with adjustment of the optical quantity using software only, excellent image can be certainly taken.

Furthermore, by setting a lens cleaner in the inside of the open-close member 20, a surface of the front glass 12a of the camera 12 can be easily cleaned by open-close operation of the open-close member 20.

FIG. 8 shows an outward appearance by cutting the active camera apparatus according to a modification of the second embodiment. As shown in FIG. 8, a linear shape memory alloy 25 is fixed between the open-close member 20 and the inside of the outer body 1. A current will shrink the shape memory alloy 25 along a shrink direction line.

Furthermore, the torsion spring 31 (as shown in FIG. 6B) is inter-carried in a space between the support pin 21 and the support hole 22. The torsion spring 31 biases the open-close member 20 along a closing direction of the opening 2 of the outer body 1, i.e., an arrow direction B as shown in FIG. 8. Accordingly, by flowing a current from this status to the shape memory alloy 25, the shape memory alloy 25 is transformed along a shrink direction of line, and the open-close member 20 can be actuated along an opening direction.

Figure 9:
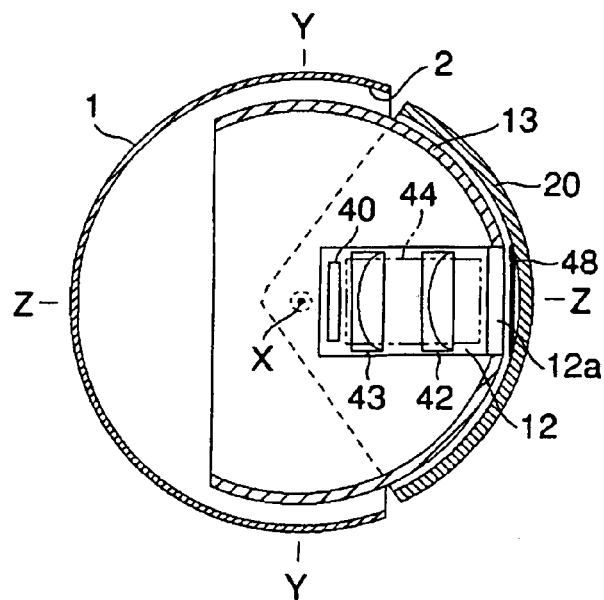
FIG. 9 is a sectional plan of the active camera apparatus according to a third embodiment of the present invention.
Figure 10:
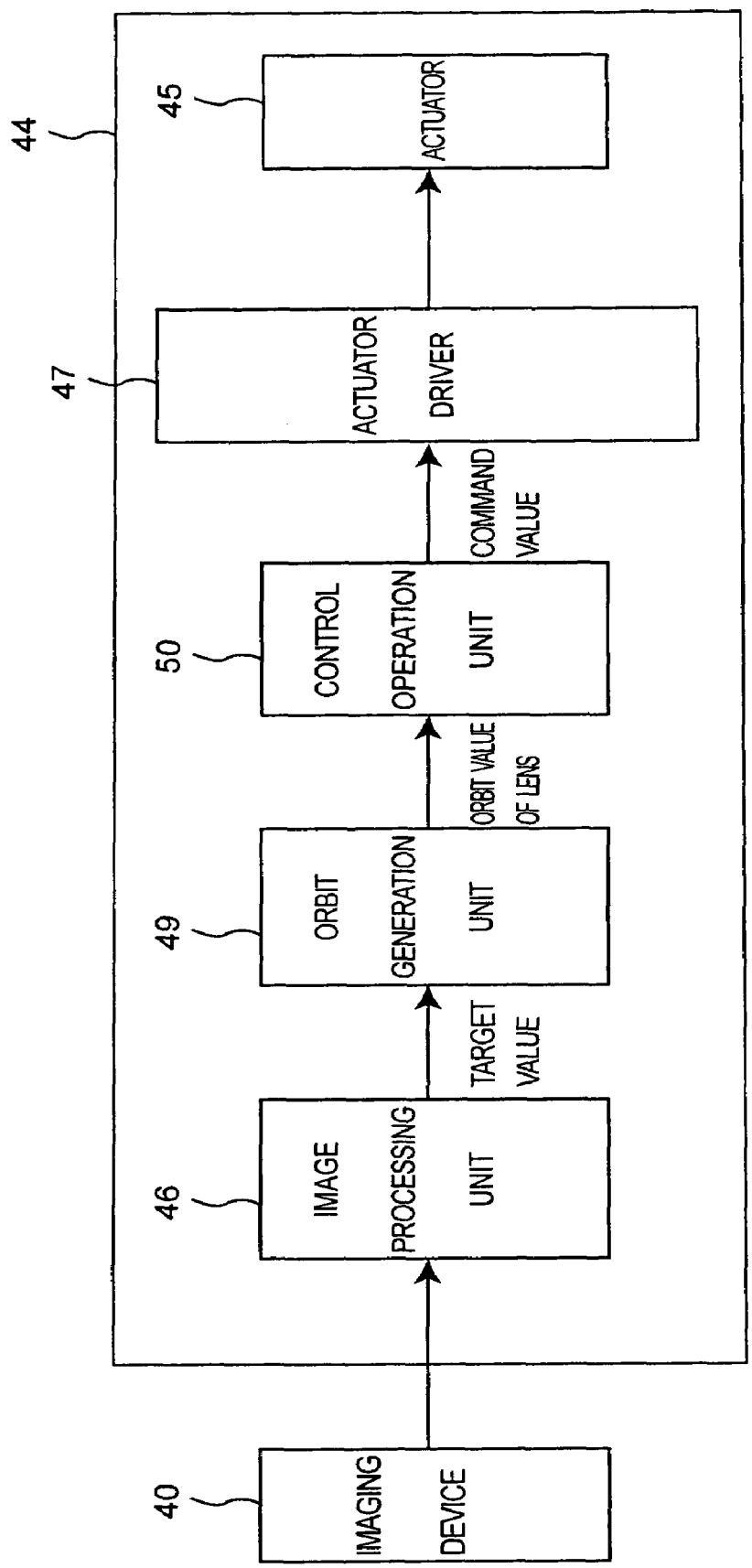
FIG. 10 is a block diagram of a lens actuator of the active camera apparatus according to the third embodiment of the present invention.

Next, the third embodiment of the present invention is explained referring to FIGS. 9~11. In this embodiment, as for components, activation, and operation the same as the first and second embodiments, its explanation is omitted.

FIG. 9 is a section of component of the active camera apparatus according to the third embodiment of the present invention. FIG. 10 is a block diagram of a lens actuator 44 according to the third embodiment. FIG. 11 is a schematic diagram showing a target (pattern) set on the inside of the open-close member 20 according to the third embodiment.

In the third embodiment, as shown in FIG. 9, the camera 12 includes an imaging device 40, a first lens 42 and a second lens 43 each forming an image of the outside of the outer body 1 onto the imaging device 40, and a lens actuator 44. The first lens 42 and the second lens 43 are moved along an optical direction (front and rear direction) of the camera 12 by the lens actuator 44. Briefly, focus and optical zoom can be automatically executed.

As shown in FIG. 10, the lens actuator 44 includes an actuator 45 such as an electrostatic actuator, an image processing unit 46 to generate a target value of lens position by processing image information output from the imaging device 40, an orbit generation unit 49 to generate an orbit value of lens based on the target value output from the image processing unit 46, a control operation unit 50 to generate a command value to an actuator driver 47 based on output from the orbit generation unit 49, and an actuator driver 47 to actuate the actuator 45 based on the command value. The image processing unit 46, the orbit generation unit 49 and the control operation unit 50 can be realized as software processing by CPU (processor) controlling the whole active camera apparatus.

As shown in FIG. 11, by using the target 48 as a pattern (drawn) on the inside of the open-close member 20, a lens position is initialized.

First, the camera 12 inputs an image of the target 48 from a predetermined field of view, and image information is supplied to the image processing unit 46. By moving the lenses 42 and 43 along the optical direction, image processing is executed for the image information.

Concretely, while the lenses 42 and 43 are moving along the optical direction, the image processing unit 46 calculates an average intensity of the whole image of the target 48 in order, and detects an actual position of the lenses 42 and 43 where the average intensity is maximum. Position data of the lenses 42 and 43 where the average intensity is maximum is determined by a lens parameter. Accordingly, by setting this position as an initial position of lenses 42 and 43, the lens position can be initialized with high reappearance.

Figure 13:
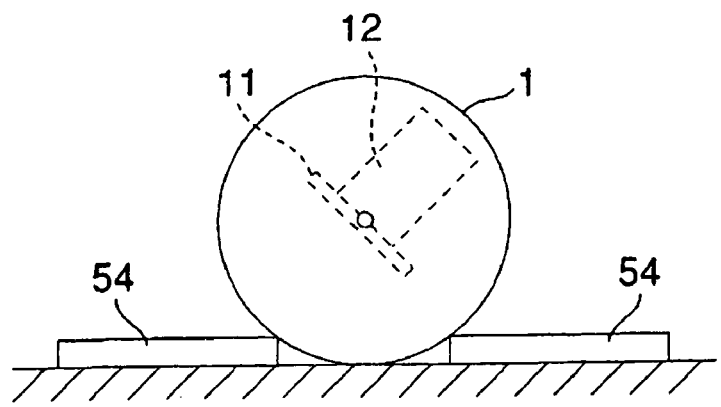
FIG. 13 is a schematic diagram of an adjustment situation of rolling of the active camera apparatus by the external environment according to the fourth embodiment of the present invention.

Next, the fourth embodiment of the present invention is explained referring to FIGS. 12 and 13. In this embodiment, as for components, activation, and operation the same as the first, second, and third embodiments, its explanation is omitted.

FIGS. 12A and 12B are schematic diagrams of rolling situation of the active camera apparatus according to the fourth embodiment of the present invention. FIG. 12A shows a situation that a center of gravity locates the lowest position. FIG. 12B shows a situation that the center of gravity is slightly shifted from the lowest position.

FIG. 13 is a schematic diagram of a situation that rolling of the active camera apparatus is regulated by the external environment according to the fourth embodiment.

In the fourth embodiment, as shown in FIGS. 12A and 12B, a radio module 51 (a radio communication means) to communicate with an external apparatus (not shown in FIG. ) is installed into the outer body 1.

The radio module 51 receives a command signal from the external apparatus and sends image information output from the camera 12 to the external apparatus based on the command signal. Furthermore, the radio module 51 supplies the command signal to the first motor 6 and the second motor 17 in order to change a direction of the camera 12 based on the command signal.

Under this component, even if the active camera apparatus is rolled into a narrow space, the direction of the camera 12 can be controlled from a distant place, and image information input from the camera 12 at the distant place can be obtained.

Furthermore, the outer body 1 is formed as a ball shell type. Accordingly, by changing a position of center of gravity of the active camera apparatus, the active camera apparatus can be rotationally moved on a set plane 53.

For example, in a situation that the camera 12 faces a surface of the set plane 53 as shown in FIG. 12A, the position of center of gravity 52 is located on a vertical directional axis k passing through a center of sphere of the outer body 1, and a moment of inertia does not act upon the active camera apparatus. Accordingly, the active camera apparatus stands still on the set plane 53 without rolling.

By slightly activating the camera 12 from this situation as shown in FIG. 12B, the position of center of gravity 52 shifts from the vertical directional axis k, and the moment of inertia acts upon the active camera apparatus. Accordingly, the active camera apparatus rotationally moves on the set plane 53.

In this way, when the active camera apparatus reaches a destination position, by activating the active camera apparatus slowly in order not to suddenly change the center of gravity, a direction of the camera 12 is changed without rolling the outer body 1. As a result, an imaging object can be taken from a desired viewpoint.

Furthermore, as shown in FIG. 13, if the outer body 1 is fixed by the external environment 54, operation to change the viewpoint to a target by changing a direction of the camera 12 can be easily executed.

Furthermore, in the case of suddenly moving an internal mechanism such as the camera 12, a rolling movement of the active camera apparatus may be realized by utilizing a movement acceleration acting the center of gravity.

Figures 14A, 14B:
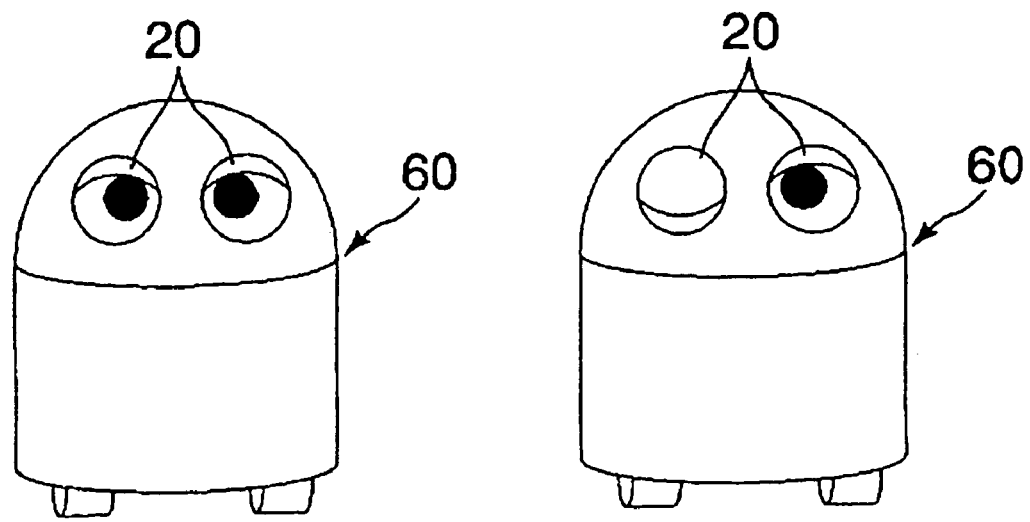
FIGS. 14A and 14B are schematic diagrams of a reaction situation of a robot apparatus according to a fifth embodiment of the present invention.
Figure 15:
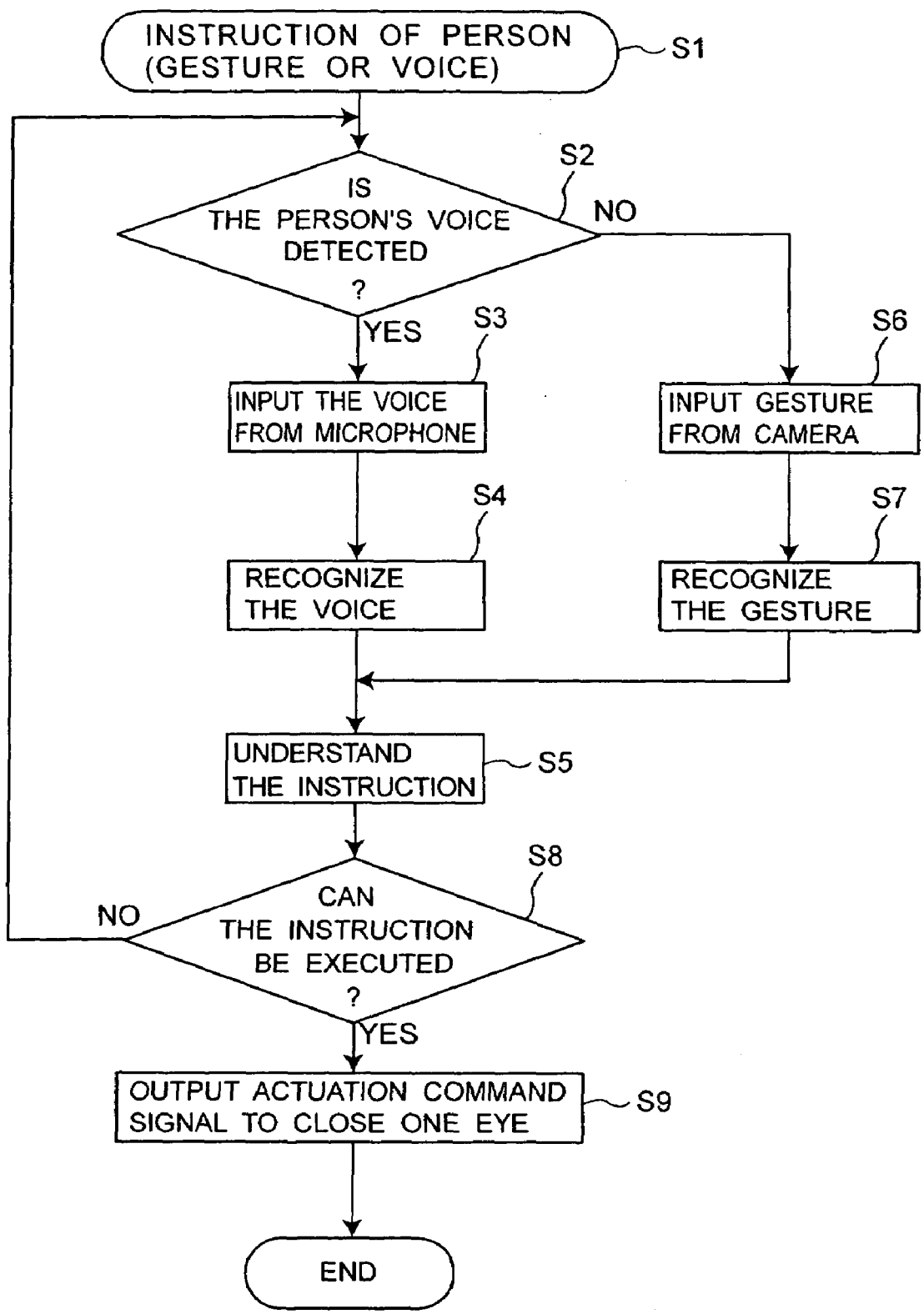
FIG. 15 is a flowchart of communication processing of the robot apparatus with a person according to the fifth embodiment of the present invention.

Next, the fifth embodiment of the present invention is explained referring to FIGS. 14 and 15. In this embodiment, as for components, activation, and operation same as the first, second, third, and fourth embodiments, its explanation is omitted.

FIGS. 14A and 14B are schematic diagrams of an outline of a robot apparatus 60 according to the fifth embodiment of the present invention. In the fifth embodiment, as shown in FIGS. 14A and 14B, the active camera apparatus of the present invention is mounted as both eyes onto a predetermined position of the robot apparatus 60.

In this component, the camera 12 installed into the outer body 1 is moved as an eyeball and the open-close member 20 is moved as an eyelid. As a result, the robot apparatus 60 can execute feeling expression such as a living thing and communicate with a person. As a communication with a person, in the case of understanding the person's instruction, the robot apparatus 60 may wink at the person by closing one open-close member 20.

Next, processing steps of the robot apparatus 60 to communicate with a person is explained referring to FIG. 15. FIG. 15 is a flow chart of processing of the robot apparatus 60 in the case of communicating with the person.

First, when the active camera apparatus is activated, a person issues an instruction (order) to the robot apparatus 60 by a gesture or a voice (S1). When a voice detector (not shown in Fig.) installed into the robot apparatus 60 detects the person's voice (YES at S2), the voice is input from a microphone (not shown in Fig.) (S3). Thus, the voice is recognized (S4) and the instruction is deciphered and understood (S5).

On the other hand, when the voice detector does not detect the person's voice (NO at S2), the person's gesture is input from the camera 12 (S6). Thus, the gesture is recognized (S7) and the instruction is deciphered and understood (s5). In the gesture recognition, a plurality of patterns is previously stored in a memory (not shown in Fig.). By deciding that the gesture corresponds to a particular pattern, the meaning of the instruction is understood.

Next, if the robot apparatus 60 decides that the instruction can be executed based on the present situation and surrounding information (YES at S8), the robot apparatus 60 outputs an activation command signal to the third motor 32, and closes the opening 2 of the outer body 1 using the open-close member 20. Briefly, the robot apparatus 60 closes an eyelid of one eye, i.e., winks as expression of the robot's intention.

On the other hand, if the robot apparatus 60 decides that the instruction can not be executed (NO at S8), the voice detector tries to detect the person's voice again.

As mentioned-above, in the present invention, the camera and the camera actuator can be protected from the external environment without enlarging component of the apparatus.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An active camera apparatus, comprising:
   an outer body of a ball shell type having an opening;
   a camera in the outer body, the camera receiving an image from outside of the outer body through the opening;
   a camera support unit in the outer body, the camera support unit rotationally supporting the camera along a first axis and a second axis crossing at a center of the outer body, the camera support unit including a half-toroidal member rotating around the first axis, an axial member as the second axis connecting between both edges of the half-toroidal member, a mounting plate through which the axial member passes mounting the camera, a camera support member as the ball shell type being located inside the outer body and fixed to the half-toroidal member and the camera, a lens of the camera facing the outside of the outer body through the opening, the camera support unit including a spur gear fixed to one edge of the half-toroidal member, an axis of the spur gear being fixedly connected to one end of the axial member, the camera support member with the camera being rotated around the first axis by rotation of the half-toroidal member and rotated around the second axis by rotation of the mounting plate, the camera support member having an engagement pin projected on an outer surface of the camera support member;
   a first camera actuator in the outer body, the first camera actuator rotationally actuating the camera around the first axis and being a first motor fixed to an inside of the outer body, a rotation axis of the first motor being parallel to the first axis, and a pinion gear joining with the rotation axis engaging an inner gear of an inner circular surface of the half-toroidal member, the half-toroidal member being rotated around the first axis by rotation of the pinion gear of the first motor;
   a second camera actuator in the outer body, the second camera actuator rotationally actuating the camera around the second axis and being a second motor fixed to the mounting plate, a rotation axis of the second motor being parallel to the second axis, a pinion gear joining with the rotation axis engaging the spur gear, the mounting plate being rotated around the second axis by rotation of the pinion gear of the second motor; and
   an open-close member as a partial ball shell type located in a space between the outer body and the camera support member, the open-close member being rotated around the second axis, the open-close member having two support pins projecting in opposite directions on an outer surface of the open-close member, the opposite directions being positioned along the second axis, the outer body having two support holes into which the support pins rotationally fit, the open-close member having an engagement hole into which the engagement pin movably fits, a length of the engagement hole along a rotation direction around the first axis being longer than a length of the engagement hole along a rotation direction around the second axis.

2. The active camera apparatus according to claim 1, wherein, when the camera support member rotates around the second axis, the open-close member links with camera support member by catching the engagement pin on an edge of the engagement hole along the rotation direction around the second axis.

3. The active camera apparatus according to claim 2, wherein, when the camera support member rotates around the first axis, the open-close member does not link with camera support member by sliding the engagement pin in the engagement hole along the rotation direction around the first axis.

4. An active camera apparatus, comprising:
   an outer body of a ball shell type having an opening;
   a camera in the outer body, the camera receiving an image from outside of the outer body through the opening;
   a camera support unit in the outer body, the camera support unit rotationally supporting the camera along a first axis and a second axis crossing at a center of the outer body, the camera support unit including a half-toroidal member rotating around the first axis, an axial member as the second axis connecting between both edges of the half-toroidal member, a mounting plate through which the axial member passes mounting the camera, a camera support member as the ball shell type being located inside the outer body and fixed to the half-toroidal member and the camera, a lens of the camera facing the outside of the outer body through the opening, the camera support unit including a spur gear fixed to one edge of the half-toroidal member, an axis of the spur gear being fixedly connected to one end of the axial member, the camera support member with the camera being rotated around the first axis by rotation of the half-toroidal member and rotated around the second axis by rotation of the mounting plate;

a first camera actuator in the outer body, the first camera actuator rotationally actuating the camera around the first axis and being a first motor fixed to an inside of the outer body, a rotation axis of the first motor being parallel to the first axis, a pinion gear joining with the rotation axis engaging an inner gear of an inner circular surface of the half-toroidal member, the half-toroidal member being rotated around the first axis by rotation of the pinion gear of the first motor;

a second camera actuator in the outer body, the second camera actuator rotationally actuating the camera around the second axis and being a second motor fixed to the mounting plate, a rotation axis of the second motor being parallel to the second axis, a pinion gear joining with the rotation axis engaging the spur gear, the mounting plate being rotated around the second axis by rotation of the pinion gear of the second motor;

an open-close member as a partial ball shell type located in a space between the outer body and the camera support member, the open-close member being rotated around the second axis, the open-close member having two support pins projecting in opposite directions on an outer surface of the open-close member, the opposite directions being positioned along the second axis, the outer body having two support holes into which the support pins rotationally fit;

a torsion spring inter-carried in a space between the support pin and the support hole, the torsion spring energizing the open-close member along a rotation direction around the second axis, and a third motor in the outer body, a rotation axis of the third motor joining with a pulley around which a wire is turned, a tip of the wire being connected to one end of an inside of the open-close member.

5. The active camera apparatus according to claim 4, wherein, when the third motor actuates the rotation axis, the open-close member opens or closes the opening of the outer body around the second axis by adjusting a length of the wire.

* * * * *